US010587794B2

(12) United States Patent
Tabuchi

(10) Patent No.: US 10,587,794 B2
(45) Date of Patent: Mar. 10, 2020

(54) METHODS AND APPARATUS FOR ACTUATOR CONTROL

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoeniz, AZ (US)

(*) Notice: Subject to any disclaimer, the term of this patent is extended or adjusted under 35 U.S.C. 154(b) by 7 days.

(21) Appl. No.: 15/962,704

(22) Filed: Apr. 25, 2018

(65) Prior Publication Data
US 2019/0335087 A1 Oct. 31, 2019

(51) Int. Cl.
G02B 7/09 (2006.01)
H04N 5/232 (2006.01)

(52) U.S. Cl.
CPC ........... H04N 5/23212 (2013.01); G02B 7/09 (2013.01)

(58) Field of Classification Search
CPC .... H04N 5/23212; G02B 7/09; G02B 27/646; G01B 7/04; H03G 3/002; G05B 19/351
See application file for complete search history.

(56) References Cited

U.S. PATENT DOCUMENTS

| 5,838,374 | A | * | 11/1998 | Kikuchi | ............ | H02K 41/0356 |
| | | | | | | 348/351 |
| 8,138,708 | B2 | * | 3/2012 | Ward | .................... | G05B 11/011 |
| | | | | | | 318/560 |
| 2007/0096720 | A1 | | 5/2007 | Clements | | |
| 2008/0130134 | A1 | * | 6/2008 | Ishida | .................. | H04N 5/2254 |
| | | | | | | 359/698 |
| 2009/0085558 | A1 | * | 4/2009 | David | .................... | G01D 5/145 |
| | | | | | | 324/207.2 |
| 2009/0224716 | A1 | * | 9/2009 | Vig | ........................ | G05B 19/19 |
| | | | | | | 318/550 |
| 2013/0154738 | A1 | * | 6/2013 | Lee | ........................ | H03G 3/002 |
| | | | | | | 330/254 |
| 2015/0268280 | A1 | | 9/2015 | Miljanic et al. | | |

* cited by examiner

Primary Examiner — Hung H Lam
(74) Attorney, Agent, or Firm — The Noblitt Group, PLLC; Hettie L. Haines

(57) ABSTRACT

Various embodiments of the present technology may comprise methods and apparatus for actuator control. The methods and apparatus may comprise a control circuit adapted to generate a control signal and various signal processing functions to generate a calibration code that is used to calibrate the control circuit. The apparatus for actuator control may comprise an induced voltage detection circuit to detect an induced voltage and a calibration circuit to generate the calibration code, which is used to calibrate the induced voltage detection circuit.

19 Claims, 7 Drawing Sheets

METHODS AND APPARATUS FOR ACTUATOR CONTROL

BACKGROUND OF THE TECHNOLOGY

Electronic devices, such as cellular telephones, cameras, and computers, commonly use a lens module in conjunction with an image sensor to capture images. Many imaging systems employ various control and/or autofocus methods and various signal processing techniques to improve image quality by adjusting the position of the lens relative to the image sensor.

Control and/or autofocus systems generally operate in conjunction with an actuator to move the lens to an optimal position to increase the image quality. Many electronic devices utilize low-noise linear motion, such as linear actuators, to facilitate autofocus and/or to reposition the lens. Due to the mechanical properties of the linear actuator, however, the settling time of the actuator may be greater than desired due to a voltage that may be induced (induced electromotive force (EMF)) by the actuator.

SUMMARY OF THE INVENTION

Various embodiments of the present technology may comprise methods and apparatus for actuator control. The methods and apparatus may comprise a control circuit adapted to generate a control signal and various signal processing functions to generate a calibration code that is used to calibrate the control circuit. The apparatus for actuator control may comprise an induced voltage detection circuit to detect an induced voltage and a calibration circuit to generate the calibration code, which is used to calibrate the induced voltage detection circuit.

BRIEF DESCRIPTION OF THE DRAWINGS

A more complete understanding of the present technology may be derived by referring to the detailed description when considered in connection with the following illustrative figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various actuators, sensors, lenses, semiconductor devices, such as transistors and capacitors, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
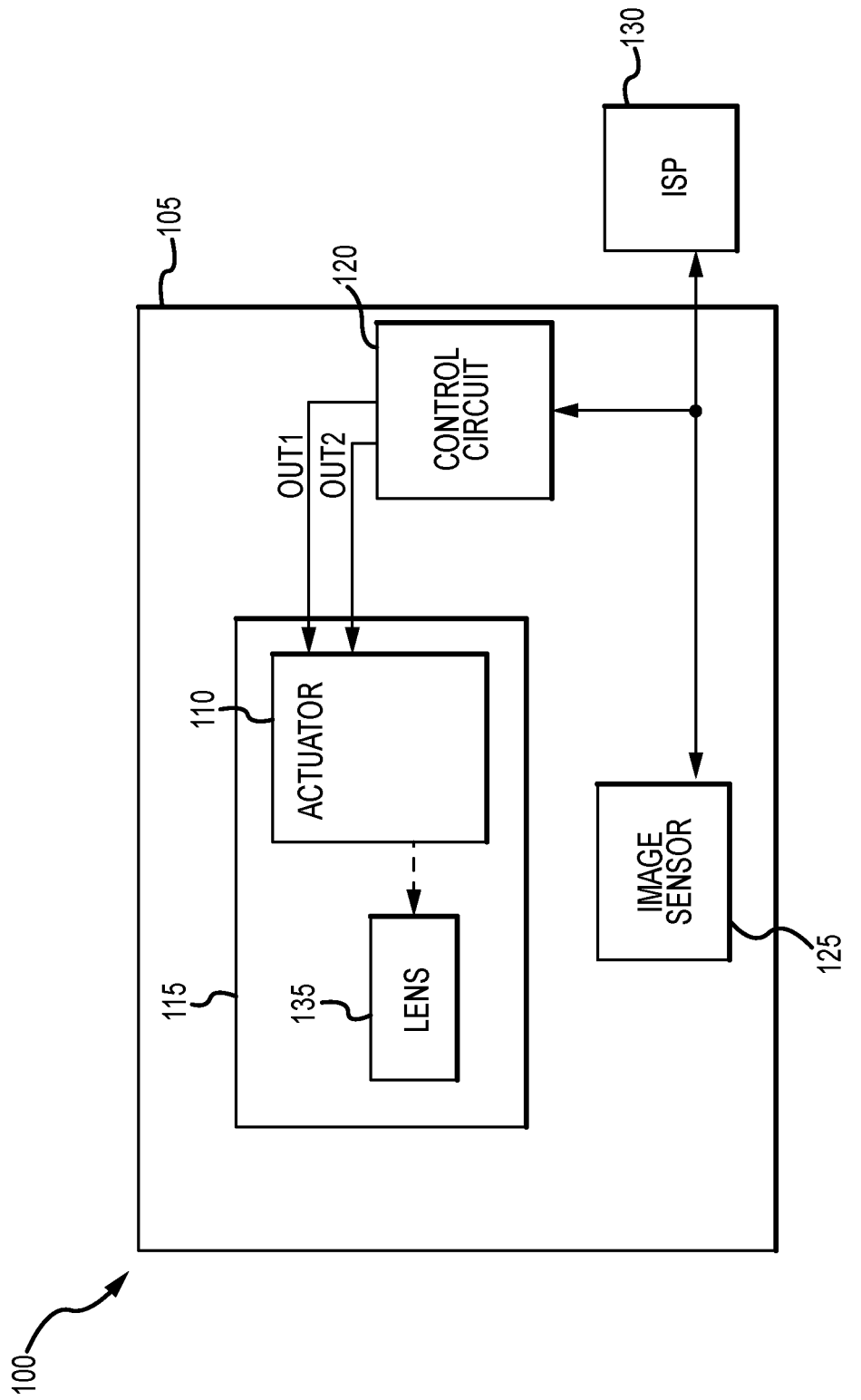
FIG. 1 is a block diagram of an imaging system in accordance with an exemplary embodiment of the present technology.

Methods and apparatus for actuator control according to various aspects of the present technology may operate in conjunction with any suitable electronic system, such as imaging systems, "smart devices," wearables, consumer electronics, and the like. Referring to FIG. 1, an exemplary imaging system 100 may be incorporated into an electronic device, such as a digital camera or portable computing device. For example, in various embodiments, the imaging system 100 may comprise a camera module 105 and an image signal processor (ISP) 130.

The camera module 105 may capture image data and perform various operating functions, such as autofocus and/or optical image stabilization. For example, the camera module 105 may comprise an image sensor 125, a lens module 115 positioned adjacent to the image sensor 125, and a control circuit 120. The control circuit 120 and the lens module 115 may be configured to communicate with each other and operate together to adjust a position of the lens module 115 and/or automatically focus an object or a scene on the image sensor 125.

The image sensor 125 may be suitably configured to capture image data. For example, the image sensor 125 may comprise a pixel array (not shown) to detect the light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 125 may be implemented in conjunction with any appropriate technology, such as active pixel sensors in complementary metal-oxide-semiconductors (CMOS) and charge-coupled devices.

The lens module 115 may be configured to focus light on a sensing surface of the image sensor 125. For example, the lens module 115 may comprise a lens 135, with a fixed diameter, positioned adjacent to the sensing surface of the image sensor 125. The lens module 115 may further comprise an actuator 110, for example a linear resonant actuator, such as a voice coil motor (VCM), responsive to the control circuit 120 and configured to move the lens 135 along any of an x-, y-, and, z-axis.

In various embodiments, the imaging system 100 is configured to move portions of the lens module 115 that secure the lens 135 to reposition the lens 135, such as to perform autofocus functions. For example, the lens module 115 may comprise a telescoping portion (not shown), adapted to secure the lens 135, that moves relative to a stationary portion (not shown). As such, the actuator 110 may move the telescoping portion to shift the lens 135 away from or closer to the image sensor 125 to focus the object or scene on the image sensor 125. In various embodiments, the image sensor 125 may be fixed to the stationary portion or may be arranged at a fixed distance from the stationary portion.

In various embodiments, the ISP 130 may perform various digital signal processing functions, such as color interpolation, color correction, facilitate autofocus, exposure adjustment, noise reduction, white balance adjustment, compression, and the like, to produce an output image. The ISP 130 may comprise any number of semiconductor devices, such as transistors, capacitors, and the like, for performing calculations, transmitting and receiving image pixel data, and a storage unit to store the pixel data, such as random-access memory, non-volatile memory or any other memory device suitable for the particular application. In various embodiments, the ISP 130 may be implemented with a programmable logic device, such as a field programmable gate array (FPGA) or any other device with reconfigurable digital circuits. In other embodiments, the ISP 130 may be implemented in hardware using non-programmable devices. The ISP 130 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

The ISP 130 may transmit the output image to an output device (not shown), such as a display screen or a memory component, for storing and/or viewing the image data. The output device may receive digital image data, such as video data, image data, frame data, and/or gain information from the ISP 130. In various embodiments, the output device may comprise an external device, such as a computer display, memory card, or some other external unit.

The control circuit 120 controls and supplies power to various devices within the system. For example, the control circuit 120 may control and supply power to the lens module 115 to move the actuator 110 to a desired position. The control circuit 120 may operate in conjunction with the ISP 130, the image sensor 125, and/or other systems to determine the appropriate amount of power and/or current, which corresponds to the desired position, to supply to the actuator 110. The control circuit 120 may generate and supply a current $I_{DR}$, having a magnitude and direction, to the actuator 110, which in turn moves the lens 135. The control circuit 120 may comprise any suitable device and/or system capable of providing energy to the actuator 110.

In general, the actuator 110 responds to the current $I_{DR}$ by moving the lens 135 an amount that is proportion to the current $I_{DR}$ supplied by the control circuit 120. According to an exemplary embodiment, the actuator 110 may comprise a voice coil motor. In operation, the actuator 110 may generate a self-induced voltage (i.e., a back EMF) that opposes the change that causes it and the faster the rate of change of the current $I_{DR}$, the greater the back EMF. As a result, the actuator 110 may not reach the desired position within a desired amount of time.

Figure 2:
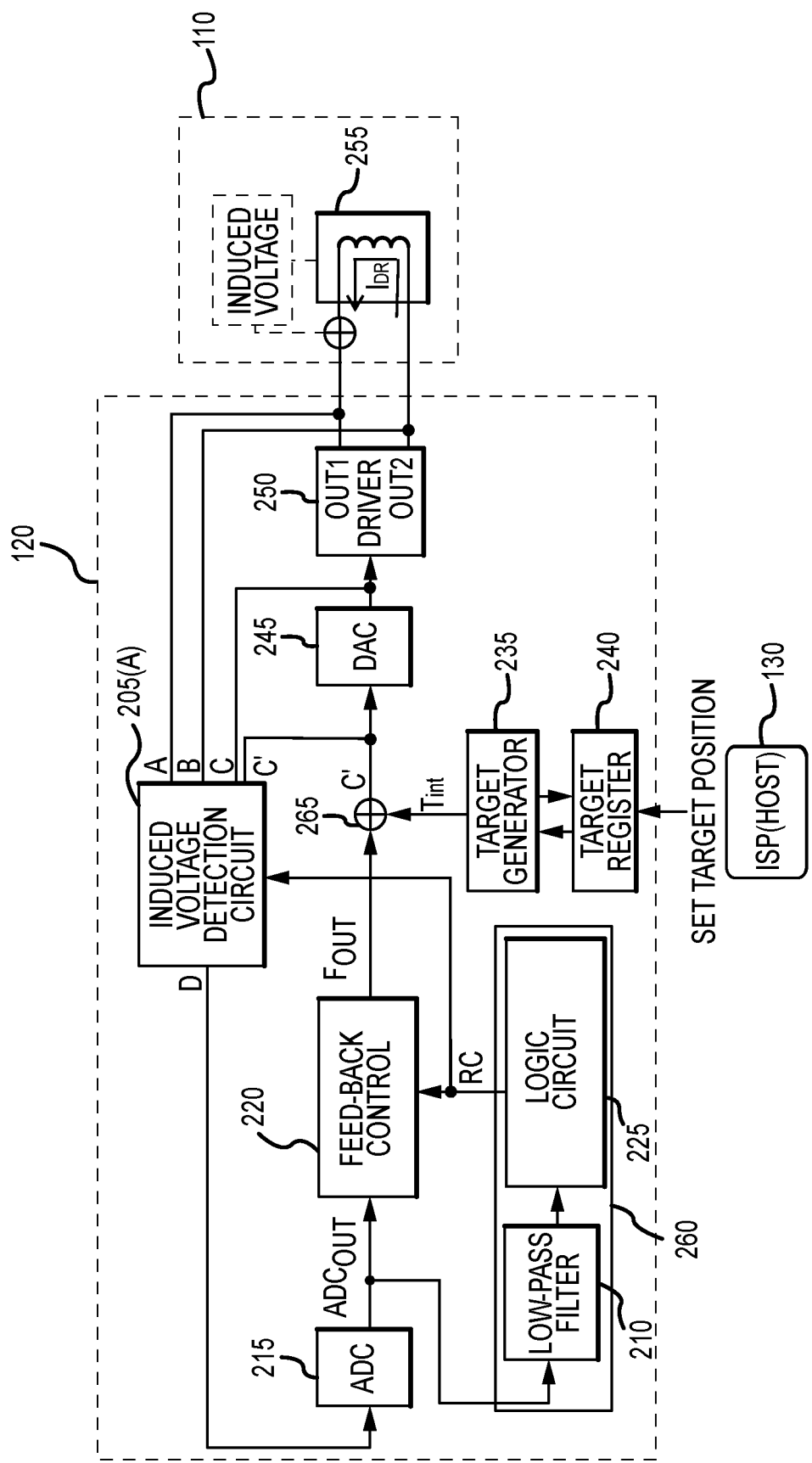
FIG. 2 is a block diagram of an actuator control system in accordance with a first embodiment of the present technology.

Referring to FIGS. 1 and 2, the control circuit 120 may comprise various circuits and/or systems adapted to receive a final position signal C', respond by generating the current $I_{DR}$ (according to the final position signal C'), and supply the current $I_{DR}$ to the actuator 110. The actuator 110 responds to the current $I_{DR}$ by moving the actuator 110 (and lens 135) to a position corresponding to the final position signal C'. For example, the control circuit 120 may comprise a driver 250 to drive the actuator 110. The control circuit 120 may further comprise various circuits and/or systems configured to perform calibration.

The driver 250 (i.e., a drive circuit) facilitates movement of the lens 135 to the desired position. The driver 250 may comprise any suitable circuit for varying a voltage across the circuit in order to maintain a constant electrical current output in response to an input signal. For example, the driver 250 may receive and respond to a DAC output signal C by generating a drive signal, such as the current $I_{DR}$. The driver 250 may facilitate movement of the lens 135 to achieve the desired position, corresponding to the final position signal C', by controlling the current $I_{DR}$ to the actuator 110, which in turn controls the magnitude and direction of movement of the lens 135. For example, the driver 250 may supply the current $I_{DR}$ to the actuator 110, wherein the current $I_{DR}$ corresponds to the final position signal C'.

In one embodiment, and referring to FIG. 2, the driver 250 may be coupled to the actuator 110 in such a way as to operate the actuator 110 in either a first direction or an opposite second direction. For example, the driver 250 may generate the current $I_{DR}$ through both of a first output terminal OUT1 and a second output terminal OUT2, wherein the current $I_{DR}$ may flow from the first output terminal OUT1 to the second output terminal OUT2 (i.e., the forward direction), or the current $I_{DR}$ may flow from the second output terminal OUT2 to the first output terminal OUT1 (i.e., the reverse direction). The direction of the current $I_{DR}$ may be based on the sign and magnitude of the final target position signal C'.

In operation, the induced voltage appears at either the first output terminal OUT1 or the second output terminal OUT2. For example, and referring to FIG. 2, when the current $I_{DR}$ is flowing from the second output terminal OUT2 to the first output terminal OUT1, then the induced voltage will appear at the first output terminal OUT1. Alternatively, when the current $I_{DR}$ is flowing from the first output terminal OUT1 to the second output terminal OUT2 (not shown), then the induced voltage will appear at the second output terminal OUT2.

Figure 4:
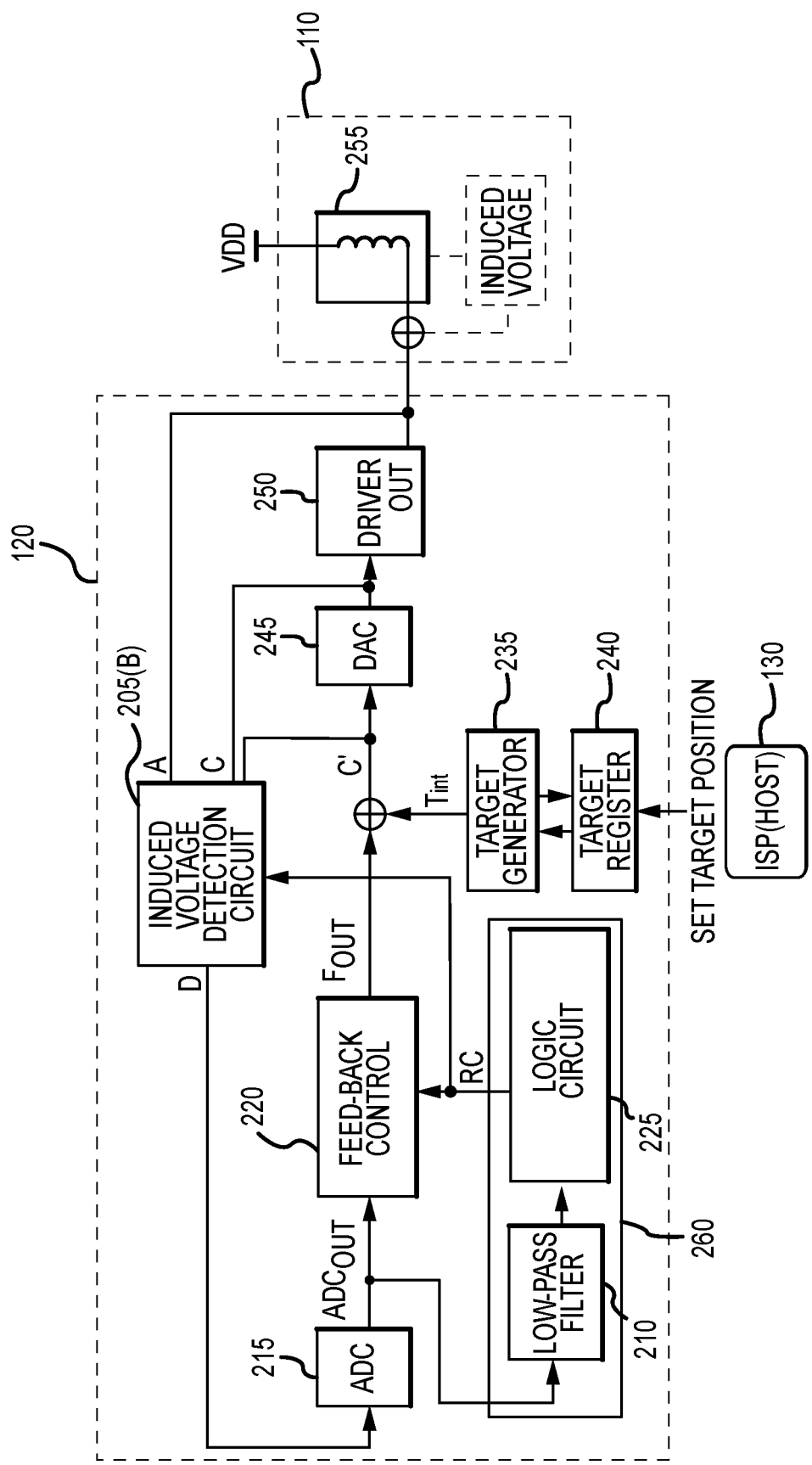
FIG. 4 is a block diagram of an actuator control system in accordance with a second embodiment of the present technology.

In an alternative embodiment, and referring to FIG. 4, the current $I_{DR}$ flows in one direction only. In the present embodiment, the driver 250 may comprise only one output terminal OUT.

Referring to FIGS. 2-5, the control circuit 120 may further comprise various feedback circuits and/or network to decrease the length of time it takes the actuator 110 (and the lens 135) to reach the desired position. In general, once the control circuit 120 determines the desired position and applies the current $I_{DR}$ to the actuator 110, the actuator 110 (and the lens 135) oscillates for a period of time before it settles into the desired position. This period of time may be referred to as the settling time. The control circuit 120 may utilize feedback control systems and/or signals to decrease the settling time. For example, the control circuit 120 may comprise an induced voltage detection circuit 205(A/B), a feedback control circuit 220, and a calibration circuit 260 that operate together to generate feedback signals.

The induced voltage detection circuit 205(A/B) may be configured to detect the induced voltage generated by the actuator 110 and generate an induced voltage signal D. In one embodiment, and referring to FIGS. 2 and 3, the induced voltage detection circuit 205(A) may be coupled to both the first and second output terminals OUT1, OUT2 in a bidirectional actuator system. In a unidirectional actuator system, and referring to FIGS. 4 and 5, the induced voltage detection circuit 205(B) may be coupled to the single output terminal OUT. In various embodiments, the induced voltage detection circuit 205(A/B) may further be communicatively coupled to receive the DAC output signal C and/or an adder output C' (also referred to as the final position signal C'). In various embodiments, the induced voltage detection circuit 205(A/B) may comprise an output voltage replica circuit 305 and a differential amplifier 310.

Figure 3:
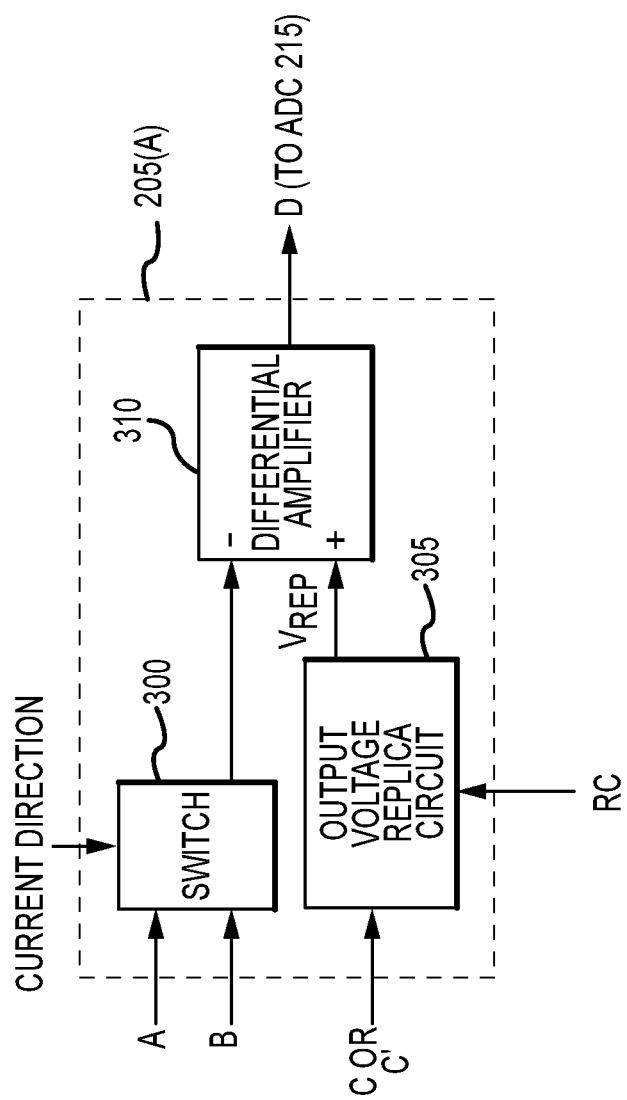
FIG. 3 is a block diagram of an induced voltage detection circuit in accordance with the first embodiment of the present technology.

In one embodiment, and referring to FIG. 3, the induced voltage detection circuit 205 may further comprise a switch 300. The switch 300 may be configured to selectively connect one of two inputs to the differential amplifier 310 according to a control signal that represents the direction of the current $I_{DR}$ through the actuator 110.

The switch 300 may be connected to the first and second output terminals OUT1, OUT2, wherein a signal at the first output terminal OUT1 may be referred to as a first signal A and a signal at the second output terminal OUT2 may be referred to as a second signal B. The switch 300 may selectively couple one of the first signal A or the second signal B to the differential amplifier 310 according to the control signal. For example, and referring to FIG. 3, if the switch 300 receives a control signal with a positive sign (+), then the switch 300 may couple the second output terminal OUT2 (the second signal B) to the differential amplifier 310, and if the switch 300 receives a control signal with a negative sign (−), then the switch 300 may couple the first output terminal OUT1 (the first signal A) to the differential amplifier 310. The switch 300 may comprise any suitable circuit and/or system to select one of various inputs according to the control signal, such as a conventional analog switch, multiplexer, transistor, gated latch circuit, and the like.

Figure 5:
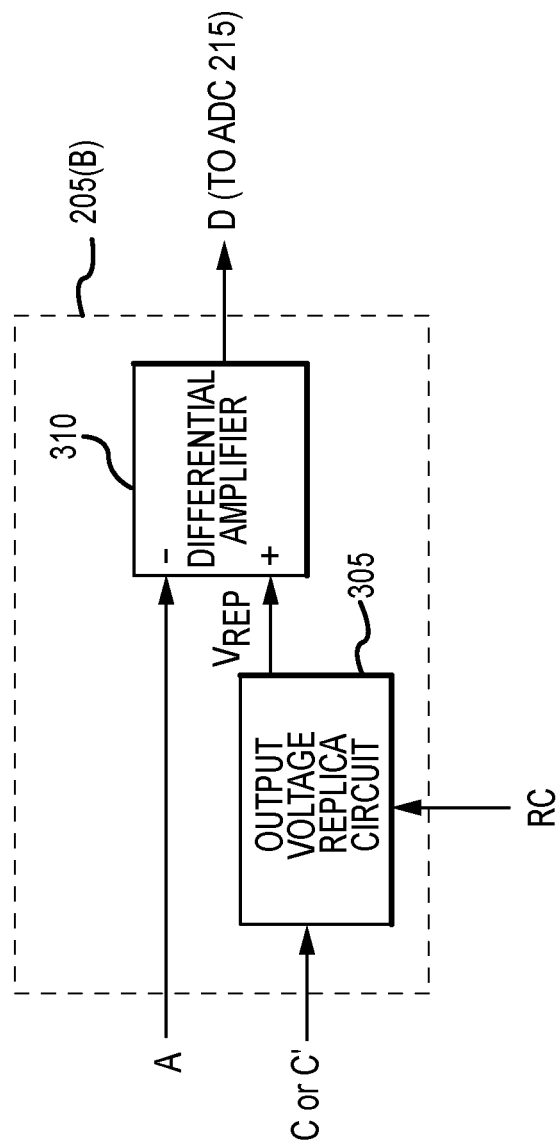
FIG. 5 is a block diagram of an induced voltage detection circuit in accordance with the second embodiment of the present technology.

In another embodiment, and referring to FIG. 5, the first signal A may be transmitted directly to the differential amplifier 310.

The output voltage replica circuit 305 is configured to receive a signal, such as the DAC output signal C and/or the adder output C' (i.e., the final position signal C'), and utilize the received signal to generate a voltage $V_{REP}$ (a replica voltage $V_{REP}$) that replicates a voltage applied to the driver 250. The output voltage replica circuit 305 may further receive a resistance code RC (e.g., a digital code), relating to a resistance of the actuator 110, from the calibration circuit 260 to adjust or otherwise calibrate the replica voltage $V_{REP}$. According to an exemplary embodiment, the replica voltage $V_{REP}$ may be described according to the following equation: $V_{REP}=V_{DD}-I_{DR}*R_1$, where $V_{DD}$ is a supply voltage, $I_{DR}$ is the current through the actuator 110, and $R_1$ is a theoretical resistance of the actuator 110.

The output voltage replica circuit 305 is further configured to transmit the replica voltage $V_{REP}$ to the differential amplifier 310. The output voltage replica circuit 305 may comprise any suitable circuit and/or system capable of replicating a voltage according to a voltage input and a calibration signal.

The differential amplifier 310 may be configured to amplify a difference between two input signals (e.g., input voltages). In one embodiment, and referring to FIG. 3, the differential amplifier 310 may receive one of the first signal A and the second signal B from the switch 300 at an inverting terminal (−) and the replica voltage $V_{REP}$ at a non-inverting terminal (+). In an alternative embodiment, and referring to FIG. 5, the differential amplifier 310 may receive the first signal A at the inverting terminal (−) and the replica voltage $V_{REP}$ at a non-inverting terminal (+). According to various embodiments, the signal input into the inverting terminal (−) is described according to the following equation: $A/B=V_{DD}-(I_{DR}*R_2)+/-V_e$, where $V_{DD}$ is the supply voltage, $I_{DR}$ is the current through the actuator 110, $R_2$ is an actual resistance of the actuator, and $V_e$ is the value of the induced voltage.

The differential amplifier 310 may output a differential output signal (also referred to as the induced voltage signal D) according to the input signals. In various embodiments, the differential amplifier 310 transmits the induced voltage signal D to the ADC 215. In an exemplary embodiment, and prior to calibration, the induced voltage signal D is described according to the following equation: $D=+/-V_e+/-(I_{DR}*R_{error})$, where $V_e$ is the induced voltage, $I_{DR}$ is the current through the actuator 110, and $R_{error}$ represents a resistance deviation value—the difference between the actual resistance $R_2$ and the theoretical resistance $R_1$. In an ideal case and after calibration, the actual resistance $R_2$ is equal to the theoretical resistance $R_1$, thus effectively removing the resistance deviation value $R_{error}$ from the induced voltage signal D.

In general, a change in temperature may result in a change to the actual resistance $R_2$ of the actuator 110. In such a case, the theoretical resistance $R_1$ may not match (equal) the actual resistance $R_2$, and therefore the replica voltage $V_{REP}$ may not actually replicate the voltage supplied to the driver 250. Accordingly, the integrity of the replica voltage $V_{REP}$ can be improved by calibrating the induced voltage detection circuit 205(A/B) and/or the output voltage replica circuit 305 by dynamically adjusting the theoretical resistance $R_1$ according to the resistance code RC.

The control circuit 120 may further comprise at least one signal converter, for example an analog-to-digital converter (ADC) 215. The ADC 215 receives an analog signal and converts the analog signal to a digital signal. The ADC 215 may comprise any suitable system, device, or ADC architecture. In various embodiments, the ADC 215 is connected to an output terminal of the induced voltage detection circuit 205(A/B) and configured to receive and convert the induced voltage signal D (from the induced voltage detection circuit 205(A/B)) to a digital signal. The ADC 215 may transmit an output signal $ADC_{OUT}$, representing the induced voltage signal D in a digital form, to the feedback control circuit 220 and the calibration circuit 260.

The feedback control circuit 220 may be configured to remove certain frequencies of a feedback signal and allow desired frequencies to pass through, apply a gain to an input signal, and/or generate a final feedback output signal $F_{OUT}$. In various embodiments, the feedback control circuit 220 may comprise a band-pass filter (not shown), which removes predetermined high and low frequencies and allows intermediate frequencies (those frequencies between the high and low frequencies) to pass through. The feedback control circuit 220 may further comprise a feedback compensation filter (not shown), such as a low-pass filter or a high-pass filter.

The feedback control circuit 220 may be coupled between an output terminal of the ADC 215 and an input terminal of an adder circuit 265. The feedback control circuit 220 may also be connected to the calibration circuit 260 and responsive to the resistance code RC. For example, the final feedback output signal $F_{OUT}$ may be influenced by the resistance code RC. The feedback control circuit 220 may utilize the resistance code RC to determine a particular gain to apply and/or to determine a particular filtering operation. The feedback control circuit 220 may comprise any suitable circuit and/or system to perform various signal filtering, such as a band-pass filter, a low-pass filter, a high-pass filter, feedback compensation filters, and the like. The particular filter may be selected according to a particular application and/or desired filtering capabilities.

According to an exemplary embodiment, the calibration circuit 260 receives the ADC output signal $ADC_{OUT}$ and generates the resistance code RC. The resistance code RC may comprise a digital code and used to calibrate the induced voltage detection circuit 205(A/B) and/or the output voltage replica circuit 305. For example, the calibration circuit 260 may dynamically adjust and transmit the resistance code RC to the induced voltage detection circuit 205(A/B) and/or the output voltage replica circuit 305, wherein the induced voltage detection circuit 205(A/B) and/or the output voltage replica circuit 305 responds to the resistance code RC by adjusting the theoretical resistance value $R_1$. Further, the resistance code RC calibrates the induced voltage detection circuit 205(A/B) by effectively removing the resistance deviation value $R_{error}$ from the output (the induced voltage signal D) of the differential amplifier 310 by adjusting the theoretical resistance $R_1$ to match the actual resistance $R_2$. In various embodiments, the calibration circuit 260 may transmit the resistance code RC to the feedback control circuit 220, the induced voltage detection circuit 205(A/B), and/or the output voltage replica circuit 305.

The calibration circuit 260 may comprise various circuits and/or systems suitable for attenuating frequency portions of the ADC output signal $ADC_{OUT}$, detecting and/or measuring a DC offset level of the induced voltage signal D and/or the ADC output signal $ADC_{OUT}$, and compares the DC offset level to one or more predetermined threshold values. For example, the calibration circuit 260 may comprise a low-pass filter 210 configured to attenuate higher frequencies and detect the DC offset level of the induced voltage signal D and/or ADC output signal $ADC_{OUT}$. The low-pass filter 210 may comprise a conventional filter.

The calibration circuit 260 may further comprise a logic circuit 225 configured to compare the detected DC offset level to a predetermined threshold value and dynamically adjust the resistance code RC according to the comparison. In general, the amount of the DC offset in the induced voltage signal D and/or the ADC output signal $ADC_{OUT}$ is related to the resistance of the actuator 110. When a previous resistance code RC and/or the theoretical resistance $R_1$ value deviates from the actual resistance $R_2$ of the actuator 110, a DC offset occurs in the induced voltage signal D. Accordingly, when the calibration circuit 260 detects a DC offset, the calibration circuit 260 dynamically adjusts the resistance code RC value, which is used to adjust the theoretical resistance $R_1$ to match the actual resistance $R_2$ of the actuator 110 and thus removing the resistance deviation value $R_{error}$, and DC offset.

The logic circuit 225 may be configured to compare a DC offset level with an upper limit (a first predetermined threshold value) and a lower limit (a second predetermined threshold value) and dynamically adjusting the resistance code RC to a value that eliminates the DC offset from the induced voltage signal D. For example, if the DC offset level reaches the upper limit, then the logic circuit 225 may decrease the resistance code RC value, and if the DC offset level reaches the lower limit, then the logic circuit 225 may increase the resistance code RC value. The calibration circuit 260 and/or logic circuit 225 may continuously monitor and detect the DC offset level and dynamically adjust the resistance code RC until no DC offset level is detected. The logic circuit 225 may comprise any circuit and/or system suitable for performing comparisons and generating an output signal based on the comparison. For example, the logic circuit 225 may be implemented in hardware using logic gates, an FPGA, and a hard-wired ASIC, in software, or any combination thereof.

The control circuit 120 may further comprise various circuits and/or systems to utilize data from the ISP 130 to generate the final position signal C' corresponding to the desired actuator position. For example, the control circuit 120 may comprise a target register 240 in communication with the ISP 130 and configured to store position information. The target register 240 may comprise any suitable memory or storage device capable of storing multiple variables at any given time.

The target register 240 may further be connected to a target generator 235 configured to generate an initial position signal $T_{int}$. The target generator 235 may be configured to access position data stored in the target register 240 and configured to perform comparisons and/or generate the initial position signal $T_{int}$. For example, the target generator 235 may comprise the signal generator described in U.S. Pat. No. 9,520,823.

In various embodiments, the control circuit 120 utilizes the initial position signal $T_{int}$ from the target generator 235 and the final feedback output signal $F_{OUT}$ from the feedback control circuit 220 to generate the final position signal C'. For example, the control circuit may utilize the adder circuit 265 to add the initial position signal $T_{int}$ to the final feedback output signal $F_{OUT}$ to compute the final position signal C'.

The control circuit 120 may further comprise a signal converter, such as a digital-to-analog converter (DAC) 245, to convert the final position signal C' to an analog signal, such as the DAC output signal C, before transmitting the signal to the driver 250. For example, an input terminal of the DAC 245 may be connected to an output terminal of the adder circuit 265. The DAC output signal C may be a positive value or a negative value. The sign (positive or negative) of the DAC output signal C and the particular numerical value may correspond to the direction and magnitude, respectively, of the current $I_{DR}$ (or voltage). The DAC 245 may communicate the DAC output signal C to the driver 250, wherein the driver 250 responds to the DAC output signal C by operating according to the sign and/or magnitude of the DAC output signal C. For example, a positive value may cause the current $I_{DR}$ to flow from a first output terminal OUT1 to a second output terminal OUT2. Conversely, a negative value may cause the current $I_{DR}$ to flow from the second output terminal OUT2 to the first output terminal OUT1. The DAC 245 may further communicate the sign of the DAC output signal C to the induced voltage detection circuit 205(A/B). In various embodiments, the DAC output signal C comprises a code (e.g., a DAC code). The DAC output signal C may correspond to a current, a voltage, or a pulse width modulation.

According to various embodiments, the methods and apparatus for actuator control operate to reduce the settling time of the actuator 110 by improving the integrity of a feedback signal, such as the induced voltage signal D, by measuring the induced voltage of the actuator 110 and dynamically adjusting the feedback signal according to a detected DC offset level in the feedback signal. The methods and apparatus utilize the feedback signal to reduce the effects of the back EMF induced by the actuator 110 and suppress resonance vibrations. This allows the actuator 110 to reach a desired position within a short period of time.

Figure 6:
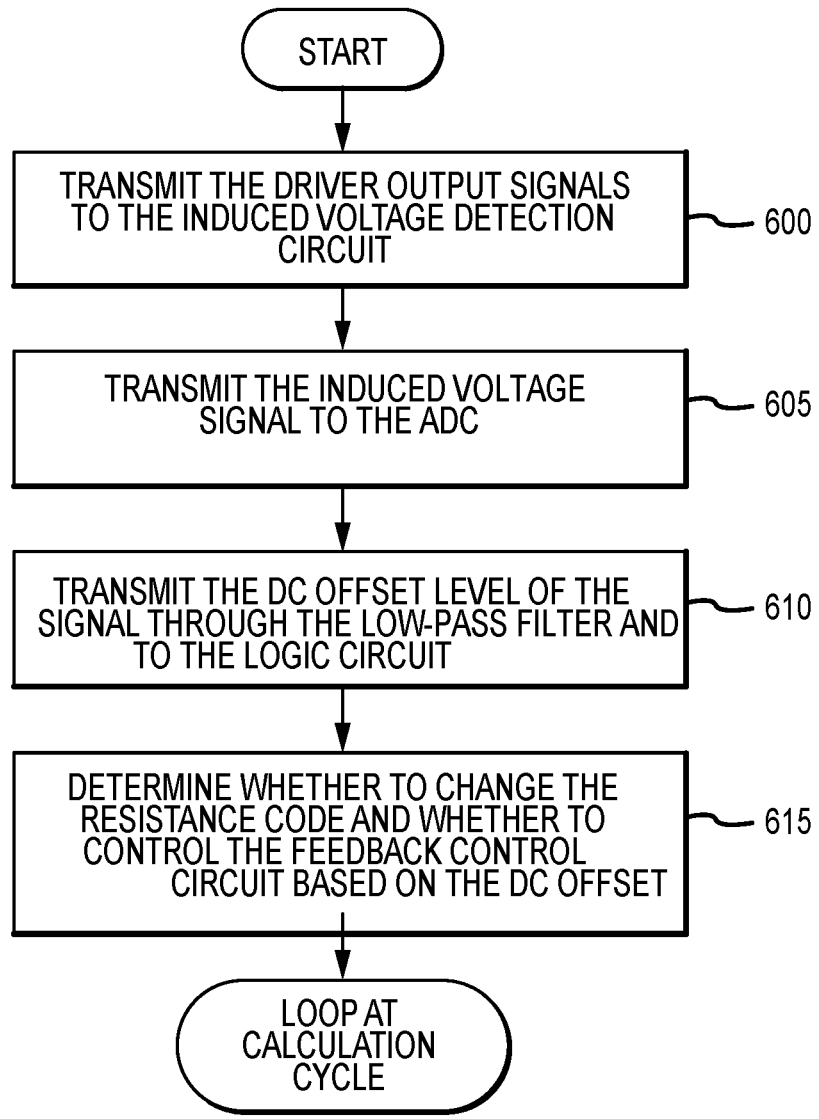
FIG. 6 is a flowchart for operating the actuator control system in accordance with an exemplary embodiment of the present technology.
Figure 7:
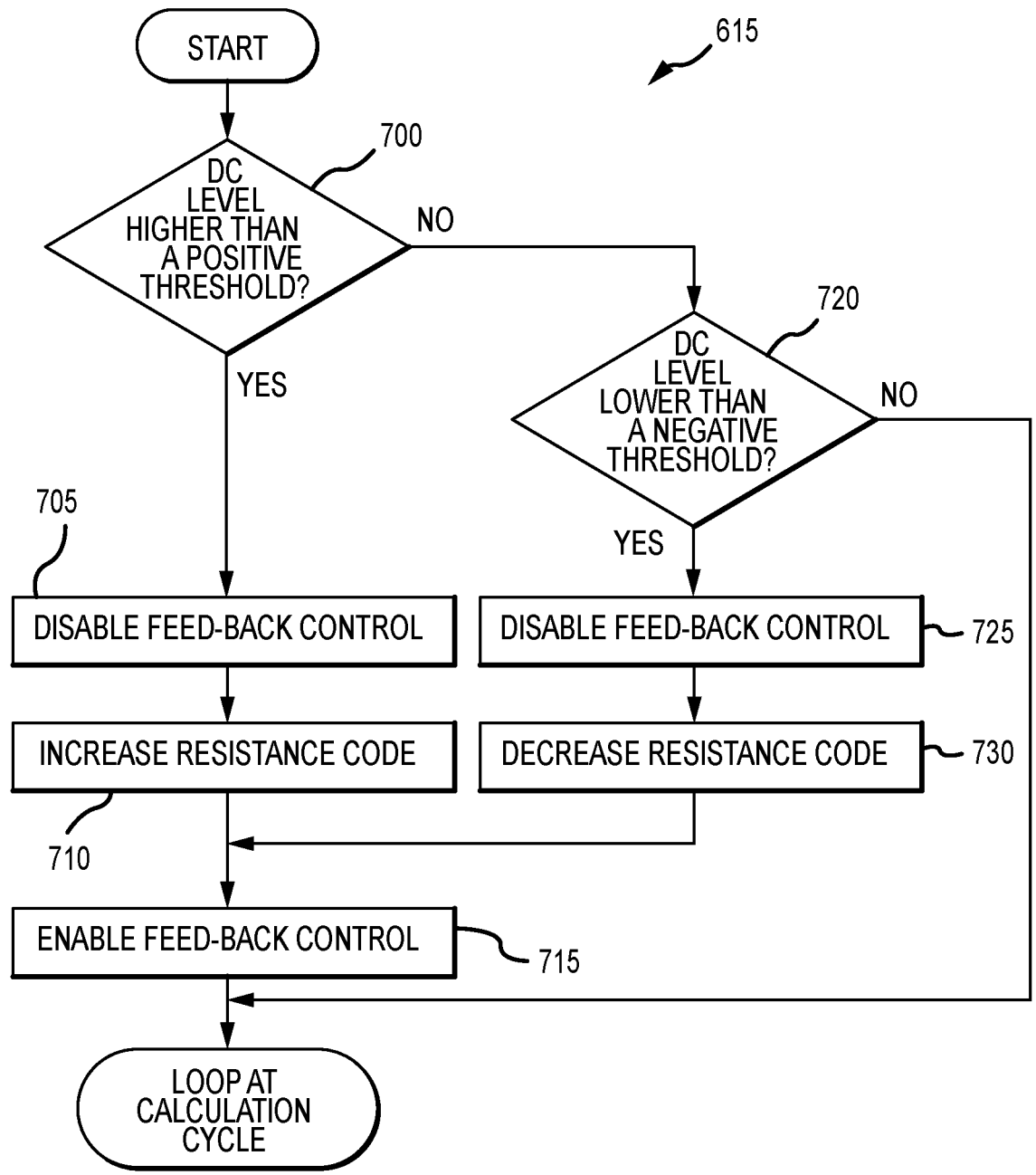
FIG. 7 is a flowchart for calibrating the actuator control system in accordance with one embodiment of the present technology.

Referring to FIGS. 2, 6, and 7, during operation, the actuator 110 may experience vibrations due to user-induced external vibrations or vibrations due to generating a new initial target position $T_{int}$, both of which may induce the back EMF. The control circuit 120 may operate to detect the back EMF and provide feedback signals to control and/or suppress the vibrations.

In an exemplary operation, the control circuit 120 may transmit the output signals (e.g., signals A and B) to the induced voltage detection circuit 205(A/B) via transmission lines connected between the output terminals of the driver 250 (i.e., OUT1 and OUT2) and the actuator 110 (600). The control circuit 120 may also transmit the direction (e.g., forward or reverse direction) of the current $I_{DR}$ (generally in the form of a code) and the DAC output signal C to the induced voltage detection circuit 205(A/B).

The induced voltage detection circuit 205(A/B) may then generate and transmit the induced voltage signal D to the ADC 215 (605). After the ADC 215 converts the signal and transmits the converted signal to the calibration circuit 260, the calibration circuit 260 detects the DC offset level utilizing the low-pass filter 210 (610). The low-pass filter 210 then transmits a signal representing the detected DC offset level to the logic circuit 225 (610). The logic circuit 225 then compares the DC level to the upper and lower threshold values to determine whether to increase or decrease the resistance code RC value and determine whether to utilize the resistance code RC to further control the feedback control circuit 220 according to the DC offset level (615). If a DC offset is detected, the logic circuit 225 then adjusts and transmits the appropriate resistance code RC to the induced voltage detection circuit 205(A/B). The induced voltage detection circuit 205(A/B) then uses the resistance code RC to adjust the replica voltage $V_{REP}$ by adjusting the theoretical resistance value $R_1$ and generate a new induced voltage signal D, which will be free of any DC offset.

In an exemplary operation, the logic circuit 225 determines whether to adjust the resistance code RC value by determining if the DC offset level is greater than the upper threshold (e.g., a positive threshold value) (700). If the DC offset level is not greater than the upper threshold, then the logic circuit 225 determines if the DC offset level is less than the lower threshold (e.g., a negative threshold value) (720). If the DC offset level is greater than the upper threshold, then the calibration circuit 260 disables (i.e., pauses operation) the feedback control circuit 220 (705), increases the resistance code RC value (710), and then enables (i.e., restarts operation) the feedback control circuit 220 (715). If the DC offset level is less than the lower threshold, then the calibration circuit 260 disables the feedback control circuit 260 (725), decreases the resistance code RC value (730), and then enables the feedback control circuit 220 (715).

During operation, the control circuit 120 may utilize the final feedback output signal $F_{OUT}$ in conjunction with the initial position signal $T_{int}$ to control the actuator 110. According to various embodiments, the control circuit 120 may continuously detect the back EMF, generate the induced voltage signal D, and dynamically adjust or otherwise calibrate the replica voltage $V_{REP}$ and/or the induced voltage signal D to prevent a DC offset from occurring, which improves the integrity of the final feedback output signal $F_{OUT}$ and the final position signal C', thus improving the movement and/or position of the actuator 110.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. An actuator control circuit, comprising:
   a drive circuit, coupled to the actuator and configured to supply a drive signal to the actuator; and
   a feedback network connected to the drive circuit and configured to generate a feedback signal, wherein the feedback network comprises:
      an induced voltage detection circuit connected to an output terminal of the drive circuit; and
      a calibration circuit connected to the induced voltage detection circuit and configured to:
         detect a DC offset level of the feedback signal; and
         supply a code to the induced voltage detection circuit according to the detected DC offset level.

2. The actuator control circuit according to claim 1, wherein the calibration circuit comprises:
   a low pass filter; and
   a logic circuit connected to an output terminal of the low pass filter.

3. The actuator control circuit according to claim 1, wherein the feedback network further comprises an analog-to-digital converter (ADC) connected between the induced voltage detection circuit and the calibration circuit.

4. The actuator control circuit according to claim 3, wherein the feedback network further comprises a feedback control circuit connected to an output terminal of the ADC.

5. The actuator control circuit according to claim 4, wherein the calibration circuit is further configured to supply the code to the feedback control circuit to selectively operate the feedback control circuit.

6. The actuator control circuit according to claim 1, further comprising a digital-to-analog converter (DAC) connected to an input terminal of the drive circuit and an input terminal of the induced voltage detection circuit.

7. The actuator control circuit according to claim 1, wherein the induced voltage detection circuit comprises:
a replica circuit connected to an output terminal of the DAC configured to receive the code from the calibration circuit; and
a differential amplifier connected to an output terminal of the replica circuit.

8. The actuator control circuit according to claim 1, wherein the induced voltage detection circuit is further configured to receive information relating to a direction of current though the drive circuit.

9. A method for controlling an actuator, comprising:
supplying a drive signal to the actuator;
detecting an induced voltage generated by the actuator;
generating a feedback signal according to the detected induced voltage;
detecting a DC offset level of the feedback signal;
calibrating the feedback signal, comprising:
selectively adjusting a resistance code based on the detected DC offset level; and
selectively operating a feedback control circuit based on the detected DC offset level; and
operating the actuator according to the feedback signal.

10. The method according to claim 9, wherein selectively adjusting the resistance code comprises:
increasing the resistance code if the detected DC offset level is greater than a first threshold; and
decreasing the resistance code if the detected DC offset level is less than a second threshold.

11. The method according to claim 10, wherein:
the first threshold is a predetermined positive value; and
the second threshold is a predetermined negative value.

12. The method according to claim 9, wherein selectively operating the feedback control circuit comprises:
disabling the feedback control circuit prior to adjusting the resistance code; and
enabling the feedback control circuit after adjusting the resistance code.

13. An imaging system capable of performing autofocus with an actuator, comprising:
an image signal processor configured to generate a position signal; and
a camera module connected to the image signal processor, comprising:
an image sensor connected to the image signal processor; and
a control circuit connected to the image signal processor and configured to receive the position signal, wherein the control circuit comprises:
a drive circuit configured to supply a current to the actuator; and
a feedback network connected to the drive circuit and configured to generate a feedback signal, wherein the feedback network comprises:
an induced voltage detection circuit connected to an output terminal of the drive circuit; and
a calibration circuit connected to an output terminal of the induced voltage detection circuit and configured to:
detect a DC offset level of the feedback signal; and
supply a code to the induced voltage detection circuit according to the detected DC offset level;
wherein the control circuit generates a final position signal based on the position signal and the feedback signal.

14. The imaging system according to claim 13, wherein the calibration circuit is further configured to increase the code if the detected DC offset level is greater than a predetermined positive threshold value.

15. The imaging system according to claim 13, wherein the calibration circuit is further configured to decrease the code if the detected DC offset level is less than a predetermined negative threshold value.

16. The imaging system according to claim 13, wherein the feedback network further comprises:
an analog-to-digital converter (ADC) connected between an output terminal of the induced voltage detection circuit and an input terminal of the calibration circuit; and
a feedback control circuit connected to a output terminal of the ADC.

17. The imaging system according to claim 16, wherein:
the calibration circuit is further configured to supply the code to the feedback control circuit; and
the feedback control circuit is responsive to the code.

18. The imaging system according to claim 17, wherein the feedback control circuit is disabled if the detected DC offset level is:
greater than a positive threshold value; and
less than a negative threshold value.

19. The imaging system according to claim 13, wherein the calibration circuit comprises:
a low pass filter; and
a logic circuit connected to an output terminal of the low pass filter.

* * * * *